US009956876B2

(12) United States Patent
Wu et al.

(10) Patent No.: US 9,956,876 B2
(45) Date of Patent: May 1, 2018

(54) SYSTEM AND METHOD FOR PROVIDING CONTENT IN AUTONOMOUS VEHICLES BASED ON REAL-TIME TRAFFIC INFORMATION

(71) Applicant: Baidu USA LLC, Sunnyvale, CA (US)

(72) Inventors: Shuang Wu, Fremont, CA (US); Liyun Li, San Jose, CA (US); Shaoshan Liu, Fremont, CA (US); James Peng, Fremont, CA (US)

(73) Assignee: BAIDU USA LLC, Sunnyvale, CA (US)

( * ) Notice: Subject to any disclaimer, the term of this patent is extended or adjusted under 35 U.S.C. 154(b) by 0 days. days.

(21) Appl. No.: 15/164,838

(22) Filed: May 25, 2016

(65) Prior Publication Data
US 2017/0341513 A1 Nov. 30, 2017

(51) Int. Cl.
| B60K 35/00 | (2006.01) |
| G01C 21/00 | (2006.01) |
| G01C 21/36 | (2006.01) |
| B60W 50/00 | (2006.01) |
| G06K 9/00 | (2006.01) |
| G06K 9/62 | (2006.01) |
| G06K 9/46 | (2006.01) |

(52) U.S. Cl.
CPC ............ *B60K 35/00* (2013.01); *B60W 50/00* (2013.01); *G01C 21/3697* (2013.01); *G06K 9/00791* (2013.01); *G06K 9/46* (2013.01); *G06K 9/6267* (2013.01)

(58) Field of Classification Search
None
See application file for complete search history.

(56) References Cited

U.S. PATENT DOCUMENTS

2011/0106428 A1* 5/2011 Park .................... G01C 21/3647
701/533
2013/0046636 A1* 2/2013 Asnake .............. G06Q 30/0261
705/14.63
(Continued)

FOREIGN PATENT DOCUMENTS

JP H09305107 A 11/1997
JP H10100737 A 4/1998
(Continued)

OTHER PUBLICATIONS

EP Patent Application No. 16201075.5, European Search Report, dated Jan. 17, 2017, 6 pages.

*Primary Examiner* — Kevin P Mahne
(74) *Attorney, Agent, or Firm* — Womble Bond Dickinson (US) LLP

(57) ABSTRACT

In one embodiment, location and route information of a route associated with the autonomous vehicle is obtained, where the route includes a starting location and a destination. Real-time traffic information of the route is obtained based on the location and route information. A driving mode of the autonomous vehicle is determined based on the location and route information and the real-time traffic information. A content item is selected from a list of content items obtained from a content database based on the determined driving mode. The selected content item is displayed in a display device within the autonomous vehicle.

24 Claims, 8 Drawing Sheets

(56) References Cited

U.S. PATENT DOCUMENTS

| | | | |
|---|---|---|---|
| 2015/0339928 A1* | 11/2015 | Ramanujam | G06Q 10/00 701/23 |
| 2015/0348112 A1 | 12/2015 | Ramanujam | |
| 2016/0061617 A1 | 3/2016 | Duggan et al. | |
| 2016/0165174 A1* | 6/2016 | Nishimura | H04N 21/41422 386/248 |
| 2016/0292507 A1* | 10/2016 | Ghoson | G06F 17/30241 |

FOREIGN PATENT DOCUMENTS

| | | | | |
|---|---|---|---|---|
| JP | 2004101248 A | 4/2004 | | |
| JP | 2005014784 A | 1/2005 | | |
| WO | WO 2012089283 A1 * | 7/2012 | | G01C 21/3697 |
| WO | 2014/006688 A1 | 1/2014 | | |

* cited by examiner

SYSTEM AND METHOD FOR PROVIDING CONTENT IN AUTONOMOUS VEHICLES BASED ON REAL-TIME TRAFFIC INFORMATION

FIELD OF THE INVENTION

Embodiments of the present invention relate generally to content searching and delivery. More particularly, embodiments of the invention relate to content searching and delivery in an autonomous vehicle.

BACKGROUND

Vehicles operating in an autonomous mode (e.g., driverless) can relieve occupants, especially the driver, from some driving-related responsibilities. When operating in an autonomous mode, the vehicle can navigate to various locations using onboard sensors, allowing the vehicle to travel with minimal human interaction or in some cases without any passengers. Thus, autonomous vehicles give passengers, especially the person who would otherwise be driving the vehicle, the opportunity to do other things while travelling. Instead of concentrating on numerous driving-related responsibilities, the driver may be free to watch movies or other media content, while riding in an autonomous vehicle.

However, conventional content delivery systems in an autonomous vehicle typically provide static content to users without considering real-time traffic environment in which the autonomous vehicle is operating. The delivered content may or may not be interesting to the user ridding the autonomous vehicle.

BRIEF DESCRIPTION OF THE DRAWINGS

Embodiments of the invention are illustrated by way of example and not limitation in the figures of the accompanying drawings in which like references indicate similar elements.

DETAILED DESCRIPTION

Figure 1:
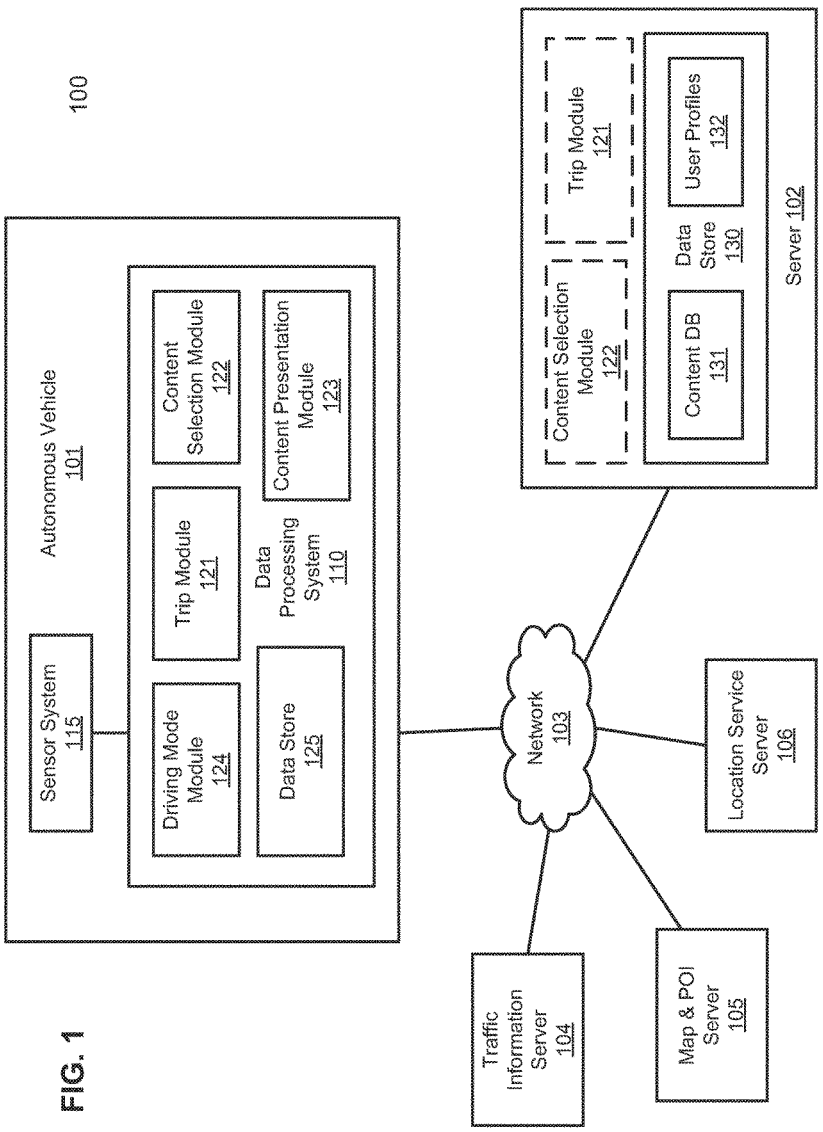
FIG. 1 is a block diagram illustrating a networked system according to one embodiment of the invention.

Various embodiments and aspects of the inventions will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

Reference in the specification to "one embodiment" or "an embodiment" means that a particular feature, structure, or characteristic described in conjunction with the embodiment can be included in at least one embodiment of the invention. The appearances of the phrase "in one embodiment" in various places in the specification do not necessarily all refer to the same embodiment.

According to some embodiments, a content delivery system of an autonomous vehicle takes into consideration of the unique setting of passengers in transit inside the autonomous vehicle. Free from the duty of driving, passengers' attention can focus on something else, such as highly targeted, context-aware and personalized content. In such setting, the start and end points of passenger's transit route, as well as point-of-interests (POIs) along the route are identified. Such information enables a novel algorithmic selection and ranking of the content of various formats, including but are not limited to, text, picture, video and interactive content. Especially when there is heavy traffic, or at traffic red light, the users would spend more time looking at the content delivered. The content delivery system is to integrate route information, a user profile, and traffic conditions to deliver content to autonomous vehicle passengers in a personalized or customized manner. The delivered content is suitable with respect to the driving condition or environment at the point in time.

According to one embodiment, when a user (e.g., a passenger) enters an autonomous vehicle and enters a destination, location and route (LR) information (e.g., starting location and the destination location) is obtained. The location and route information is constantly updated while the autonomous vehicle is traveling along the route. Real-time traffic information is also obtained based on the location and route information during the operation of the autonomous vehicle. A driving mode of the autonomous vehicle is determined based on the location and route information and the real-time traffic information. A list of content items that are suitable to be presented to the user is searched and identified based on the driving mode. One or more of the content items are then selected and displayed on one or more display devices within the autonomous vehicle.

In one embodiment, a driving mode can be one of a fast driving mode, a slow driving mode, and a stop mode. A fast driving mode may refer to an average speed of the autonomous vehicle within a predetermined period of time that is above a predetermined threshold. Similarly, a slow driving mode may refer to an average speed of the autonomous vehicle within a predetermined period of time that is below a predetermined threshold. Certain types of content items (e.g., media content having a longer playing time) may only be selected for display when the autonomous vehicle is operating in a slow driving mode or a stop mode.

According to another embodiment, a content selection model is trained based on a set of known features of location and route information, a set of known features of real-time traffic information, and a set of known features of POIs. During the transit of the autonomous vehicle, once the location and route information, real-time traffic information, and point of interest (POI) information along the route are dynamically obtained, the corresponding features are extracted. The content selection model is then applied to the extracted features to generate an output. The output may indicate a particular category of content. Based on the output, a list of content items are identified.

In a further embodiment, an image of a physical object (e.g., a building, a sign) external to the autonomous vehicle is captured using an image sensor of the autonomous vehicle. An image recognition is performed on the image to recognize the physical object. One or more keywords or a POI associated with the physical object may be determined based on the image recognition. A content item is selected from the list and the selected content item is then augmented onto the image. The augmented image is then displayed on a display device.

FIG. 1 is a block diagram illustrating a network configuration according to one embodiment of the invention. Referring to FIG. 1, network configuration 100 includes an autonomous vehicle communicatively coupled to a centralized server 102 over a network 103. Although there is one autonomous vehicle shown, multiple autonomous vehicles can be coupled to and managed by server 102 over network 103. Network 103 may be any type of networks such as a local area network (LAN), a wide area network (WAN) such as the Internet, a cellular network, a satellite network, or a combination thereof, wired or wireless. Server 102 may be any kind of servers or a cluster of servers, such as Web or cloud servers, application servers, backend servers, or a combination thereof.

In one embodiment, autonomous vehicle 101 includes, but is not limited to, sensor system 115 and data processing system 110. Sensor system 115 includes a variety of sensors or sensing devices that are required in order to enable autonomous vehicle 101 to navigate various roads and places. For example, sensor system 115 may include one or more cameras, a microphone, a global positioning system (GPS), an internal measurement unit (IMU), a radar system, and/or a light detection and range (LIDAR) system. Data processing system 110 is communicatively coupled to sensor system 115, for example, via a bus, an interconnect, or a network. Data processing system 110 is operable to process any data received from sensor system 115 and to manage or control sensor system 115. Data processing system 110 may be a dedicated computer equipped with necessary software and hardware to process information received from sensor system 115 and to control and drive autonomous vehicle 101.

In one embodiment, data processing system 110 includes, but is not limited to, trip module 121, content selection module 122, content presentation module 123, driving mode module 124, and data store 125. Modules 121-124 may be implemented in software, hardware, or a combination thereof. For example, modules 121-124 may be loaded into a system memory and executed by one or more processors of data processing system 110. Trip module 121 manages any data related to a trip of a user. A user may log in and specify a starting location and a destination of a trip, for example, via a user interface. Trip module 121 communicates with other components of autonomous vehicle 101 to obtain the trip related data. For example, trip module 121 may obtain location and route information from location server 106 and map and POI (MPOI) server 105. Location server 106 provides location services and MPOI server 105 provides map services and the POIs of certain locations. During traveling of autonomous vehicle 101 along the route, trip module 121 may also obtain real-time traffic information from traffic information system or server (TIS) 104. Note that servers 104-106 may be operated by a third party entity. Alternatively, the functionalities of servers 104-106 may be integrated with server 102.

In one embodiment, based on the location and route information, MPOI information, and real-time traffic information, driving mode module 124 determines a driving mode of autonomous vehicle 101. A driving mode can be one of a fast mode, slow mode, and a stop mode. A fast mode refers to a situation in which autonomous vehicle 101 is traveling at an average speed higher than a predetermined speed over a predetermined period of time. Similarly, a slow mode refers a situation in which autonomous vehicle 101 is traveling at an average speed lower than a predetermined speed over a predetermined period of time. A stop mode means autonomous vehicle 101 is stopped, for example, at a traffic light.

Based on the determined driving mode, content selection module searches in a content database of data store to identify a list of content items (e.g., special content or sponsored content such as Ads) that are suitable to be presented for the corresponding driving mode. For example, certain content may only be presented if the autonomous vehicle is operating in a slow driving mode or a stop driving mode. The rationale behind it is that the user would have more time enjoying the content. In other situations, certain content, such as a video having certain playing time may be suitable for the slow driving mode or stop mode, such that a user can have sufficient time to complete viewing the content. The content items may be ranked according to a predetermined ranking algorithm or ranking model. For example, the content items may be ranked based on user information obtained from a user profile of the user, which may be stored in data store 125. The user information may include user preference, prior behavior, or a history log associated with the user. A content item is then selected based on the rankings. The selected content item is rendered and presented to the user by content representation module 123, for example, displaying on a display device.

Data store 125 may be maintained in a persistent storage device (e.g., a non-volatile storage device such as a hard disk) storing a variety of data including, but is not limited to, a content database, a user profile, trip related information (e.g., location and route information, POIs information). Data stored in data store 125 may be obtained from a variety of data sources, such as, server 102, traffic information server 104, map and POI server 105, and location server 106. For example, content data and user profiles may be provided by and cached from content database 131 and user profiles 132 of data store 130 of server 102. Data processing system 110 further includes other components, such as one or more processors (e.g., central processing units or CPUs), a system memory, or a communication interface (e.g., wireless communication interface), etc.

Figure 2:
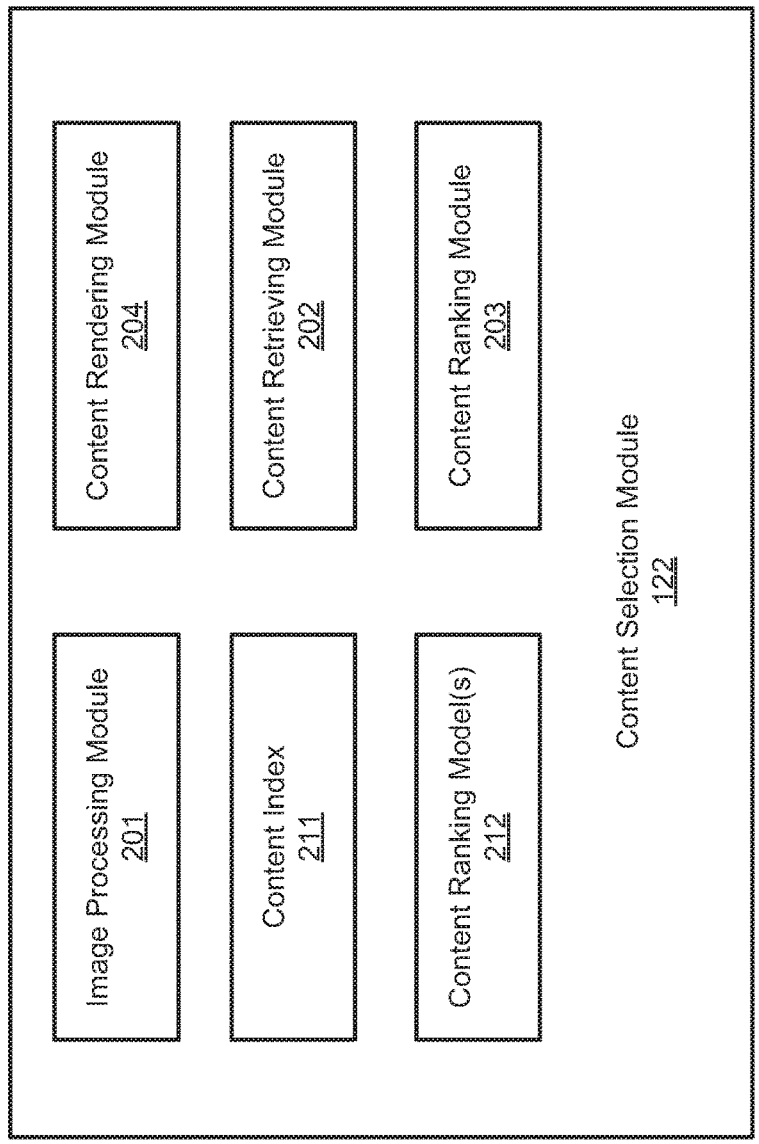
FIG. 2 is a block diagram illustrating an example of a content selection module according to one embodiment of the invention.

FIG. 2 is a block diagram illustrating an example of a content selection module according to one embodiment of the invention. Referring to FIG. 2, content selection module 122 includes, but is not limited to, image processing module 201, content retrieving module 202, content ranking module 203, and content rendering module 204. In one embodiment, based on location and route information, MPOI information, and/or real-time traffic information determined by trip module 121, as well as the driving mode of the autonomous vehicle provided by driving mode module 124, content retrieving module 202 determines certain types of content that are suitable for the current traffic environment (e.g., driving mode, and MPOIs). Content retrieving module 202 performs a lookup operation in content index 211 to identify a list content items (e.g., sponsored content or Ads) as content item candidates, for example, based on the real-time traveling information and/or driving mode.

In one embodiment, content ranking module 203 ranks the content items in the list using a variety of ranking algorithm. The content items may be ranked based on a user profile of the user. For example, the content items may be ranked based on user preferences, which may be derived from the user profile. The user profile may be compiled based on a history of user operations of the user in the past. In one embodiment, content ranking module 203 applies one or more content ranking models 212 to each of the content items to determine a ranking score for each content item. A content item having a ranking score that is above a predetermined threshold may be selected. Content ranking models 212 may be trained using sets of known features representing similar traveling environments or traffic conditions in the past. Content ranking models 212 may also be trained based on user profiles of similar users.

The selected content item is then rendered by content rendering module 202 and the rendered content may be displayed on a display device within the autonomous vehicle. In one embodiment, content rendering module 204 further augments the selected content item onto an image that is captured at the point in time using one or more cameras of the autonomous vehicle, where the image may be processed by image processing module 201. In one embodiment, image processing module 201 performs an image recognition on the image and to derive or understanding the content represented by the image. For example, image processing module 201 may derive one or more keywords describing the image or a POI. The list of content items may be identified further based on the one or more keywords or the POI represented by the image. Content rendering module then augments the selected content item onto the image generate an augmented image, where the content item may be superimposed on the image. The augmented image is then displayed on a display device of the autonomous vehicle.

In an autonomous vehicle, there may be no actual or physical window. Rather, a "window" (referred to herein as a virtual window) may be represented or replaced by a display device, i.e., a flat or curved screen display device molded into a shape of a vehicle window. The display device would display images or stream of images (e.g., video) that are captured dynamically in real-time by appropriate camera or cameras, as if the user were watching or viewing the actual physical content through a see-through window. For each of the "windows" (e.g., display devices), there is a corresponding display channel to stream the corresponding content to be displayed at real-time, which may be centrally processed by an augmenting reality system, e.g., data processing system 110. In such situation, an augmented image is displayed in a virtual reality manner, also referred to as an augmentation reality manner.

Figure 3:
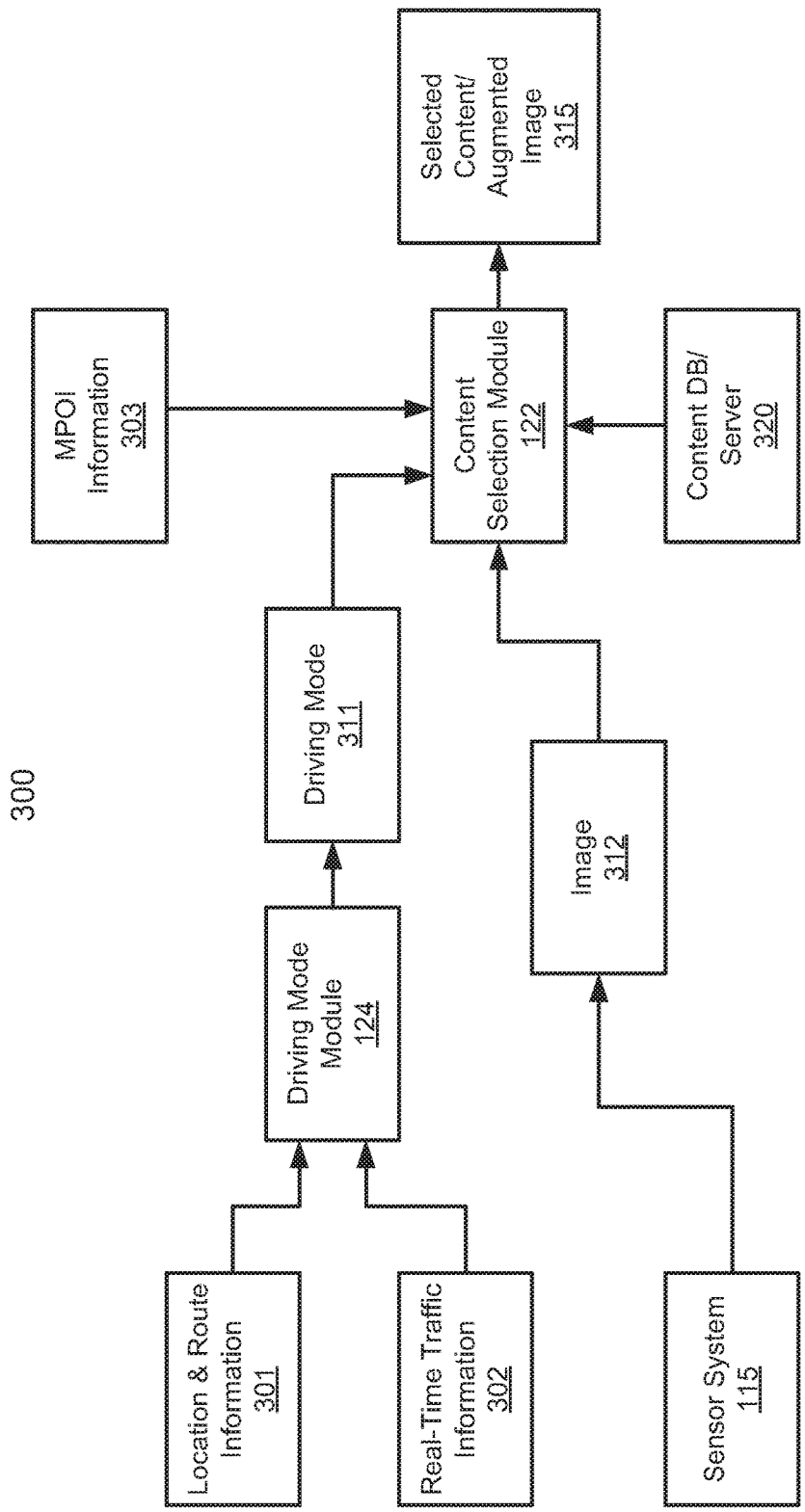
FIG. 3 is a diagram illustrating a processing flow of processing content according to one embodiment of the invention.

FIG. 3 is a diagram illustrating a processing flow of processing content according to one embodiment of the invention. Process flow 300 may be performed by data processing system 110 of FIG. 1. Referring to FIG. 3, location and route information 301, real-time traffic information 302, and MPOI information 303 are obtained, for example via trip module 121. Trip module 121 may obtain these information by communicating with proper data sources such as traffic information server 104, MPOI server 105, and location server 106, etc. In one embodiment, at least location and route information 301 and traffic information 302 are provided to driving mode module 124.

Driving mode module 124 determines driving mode 311 based on location and route information 301 and traffic information 302. Driving mode 311 may be one of a fast driving mode, a slow driving mode, or a stop mode. Based on driving mode 311, content selection module searches, identifies, and ranks a list of content items from content database or server 320. The content may be special content or sponsored content (e.g., advertisements or Ads). The list of content items may be identified and ranked further based on MPOI information 303 or a user profile of a user. Content item 315 is then selected from the ranked content items. Furthermore, content selection module may augment the selected content item 315 onto image 312 that was captured by sensor system 115 at the point in time to generate an augmented image. The augmented image is then displayed by content presentation module 123 on a display device within the autonomous vehicle.

Figure 4:
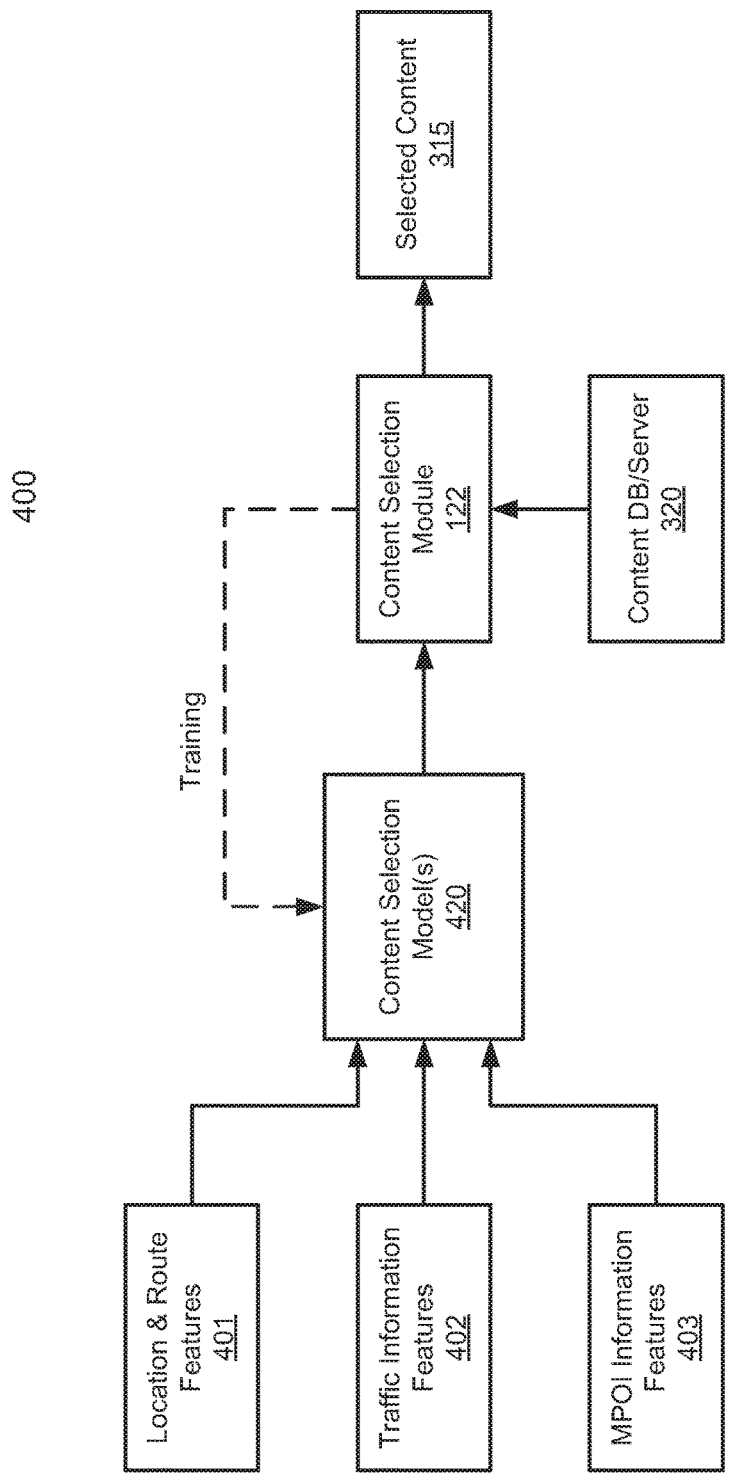
FIG. 4 is a diagram illustrating a processing flow of processing content according to another embodiment of the invention.

FIG. 4 is a diagram illustrating a processing flow of processing content according to another embodiment of the invention. Process flow 400 may be performed by data processing system 110 of FIG. 1. Referring to FIG. 4, location and route features 401, traffic information features 402, and MPOI features 403 are obtained. These location and route features 401, traffic information features 402, and MPOI features 403 may be extracted from location and route information 301, real-time traffic information 302, and MPOI information 303 of FIG. 3. Features 401-403 are provided to content selection model(s) 420. The output of content selection model 420 is utilized by content selection module 122 to search, identify, rank, and select content item 315 from content database or server 320. Content selection model 420 may be trained based on known features in the past. The output of content selection model 420 may indicate a type or category of content. The content selection may further be based on the driving mode of the autonomous vehicle.

Figure 5:
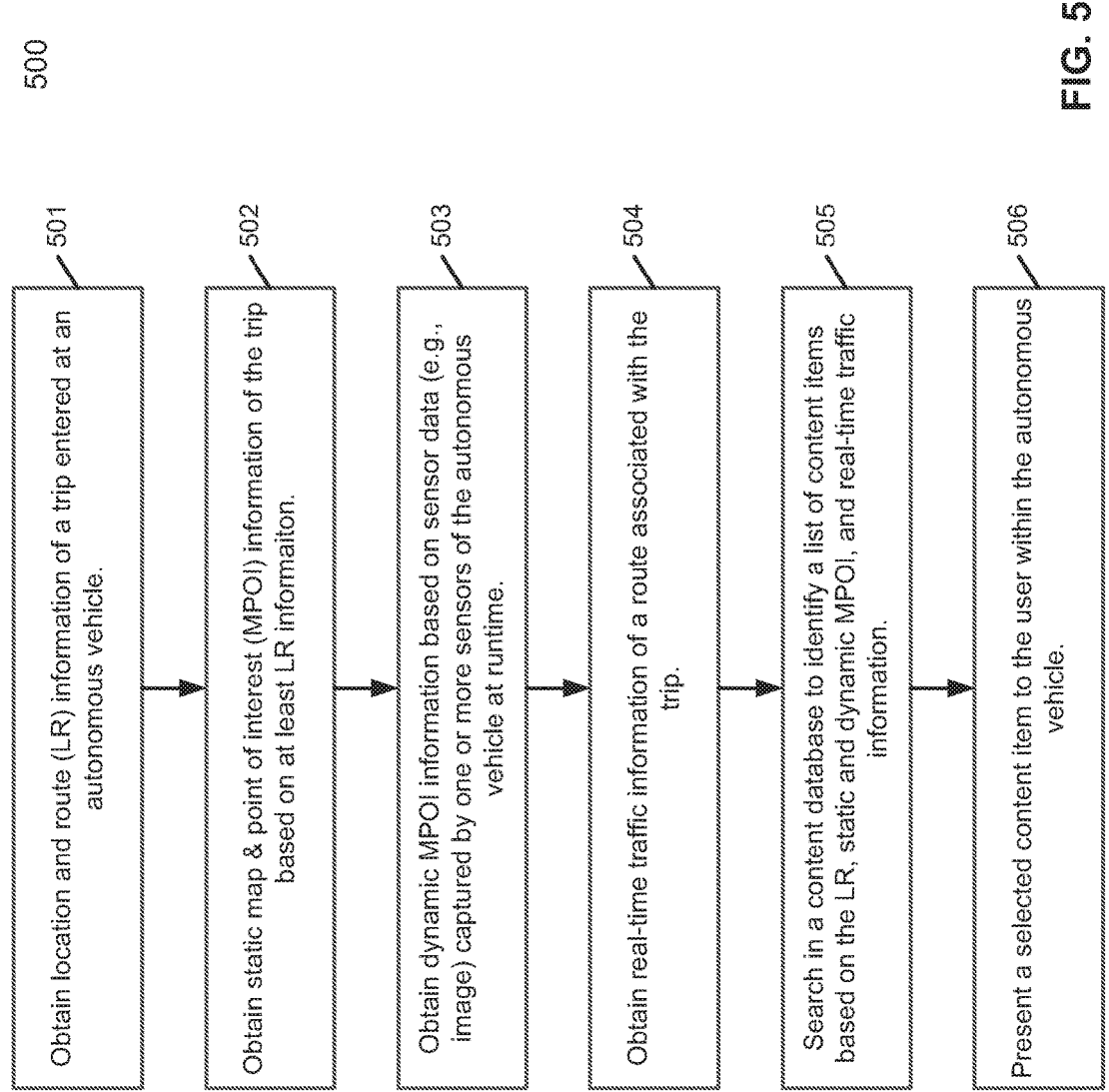
FIG. 5 is a flow diagram illustrating a process of processing content for an autonomous vehicle according to one embodiment of the invention.

FIG. 5 is a flow diagram illustrating a process of processing content for an autonomous vehicle according to one embodiment of the invention. Process 500 may be performed by processing logic which may include software, hardware, or a combination thereof. For example, process 500 may be performed by data processing system 110 of FIG. 1. Referring to FIG. 5, at block 501, processing logic obtains location and route information of a trip of an autonomous vehicle, for example, from a location service server. At block 502, processing logic obtains static MPOI information from an MPOI server based on the route associated with the trip. At block 503, processing logic obtains dynamic MPOI information based on sensor data (e.g., images) captured by one or more sensors of the autonomous vehicle. The dynamic MPOI may be determined based on an image recognition on an image captured by a camera in real time. At block 504, processing logic obtains real-time traffic information of the route. At block 505, processing logic searches in a content database to identify a list of content items based on the location and route information, static and dynamic MPOI information, and real-time traffic information. At block 506, a content item is selected to be presented to a user within the autonomous vehicle.

Figure 6:
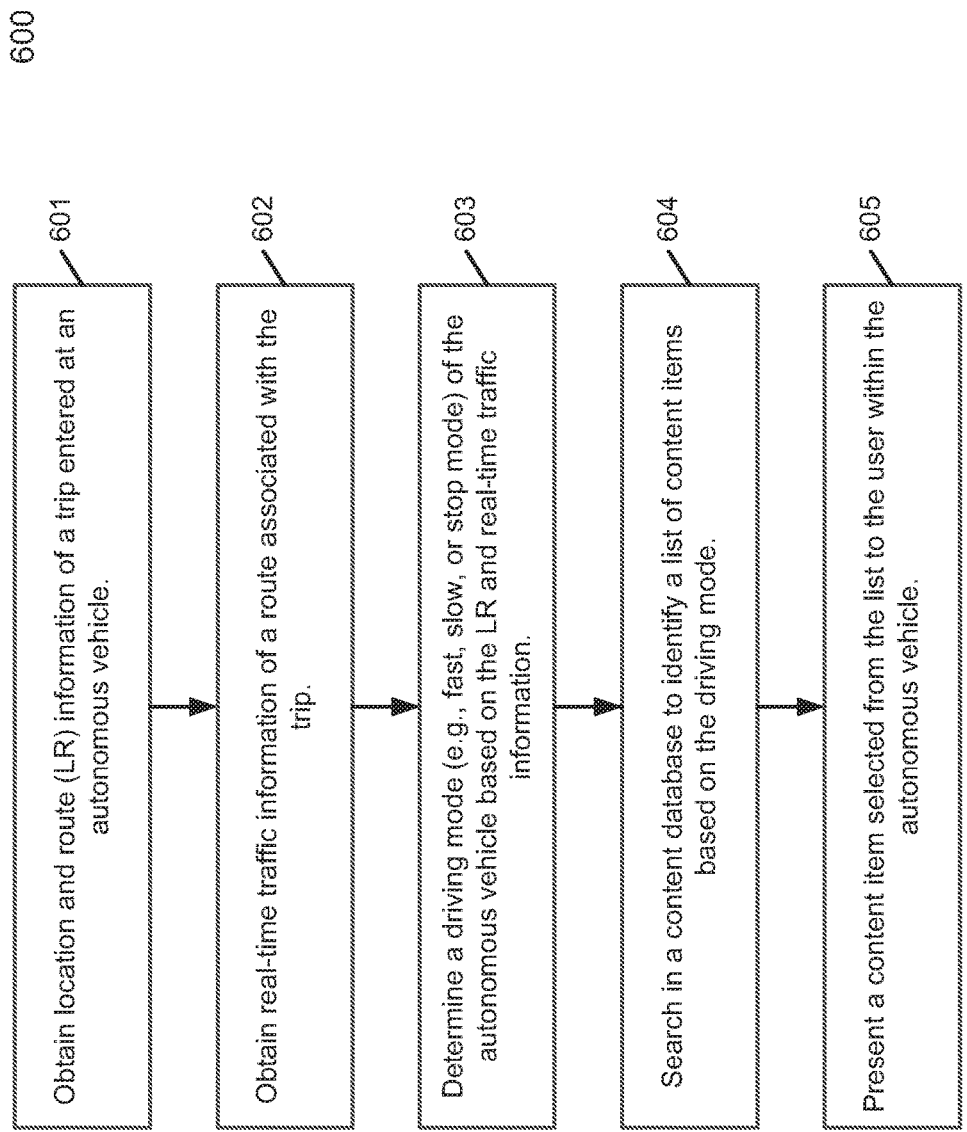
FIG. 6 is a flow diagram illustrating a process of processing content for an autonomous vehicle according to another embodiment of the invention.

FIG. 6 is a flow diagram illustrating a process of processing content for an autonomous vehicle according to another embodiment of the invention. Process 600 may be performed by processing logic which may include software, hardware, or a combination thereof. For example, process 600 may be performed by data processing system 110 of FIG. 1. Referring to FIG. 6, at block 601, processing logic obtains location and route information of a trip entered by a user of an autonomous vehicle. At block 602, processing logic obtains real-time traffic information of a route associated with the trip. At block 603, processing logic determines a driving mode of the autonomous vehicle during the transit, where the driving mode is one of a fast driving mode, a slow driving mode, or a stop mode. At block 604, processing logic searches and identifies a list of content items form a content database based on the driving mode of the autonomous vehicle. At block 605, processing logic selects and presents a content item from the list to the user within the autonomous vehicle.

Figure 7:
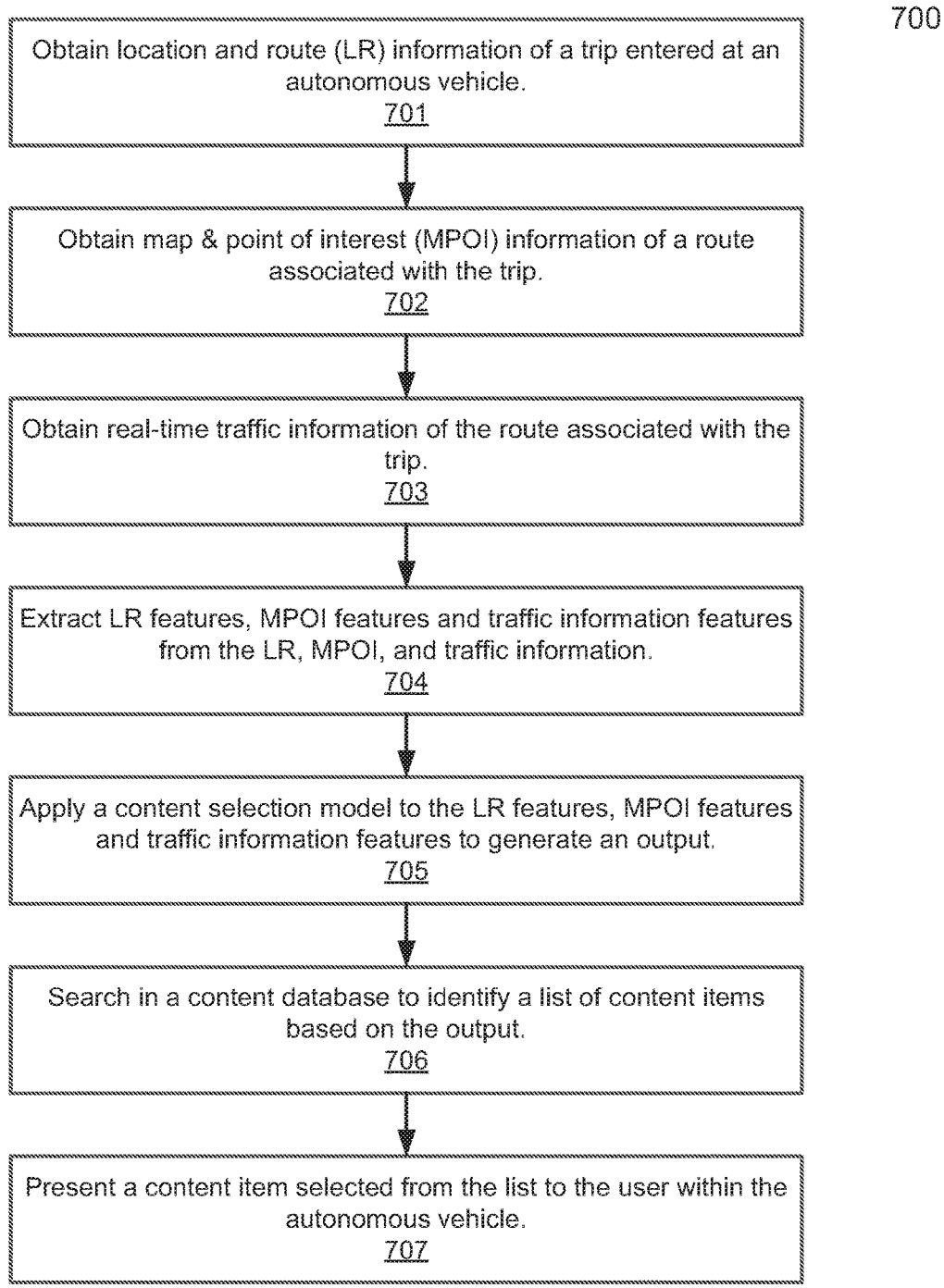
FIG. 7 is a flow diagram illustrating a process of processing content for an autonomous vehicle according to another embodiment of the invention.

FIG. 7 is a flow diagram illustrating a process of processing content for an autonomous vehicle according to another embodiment of the invention. Process 700 may be performed by processing logic which may include software, hardware, or a combination thereof. For example, process 700 may be performed by data processing system 110 of FIG. 1. Referring to FIG. 7, at block 701, processing logic obtains location and route information of a route associated with a trip specified by a user of an autonomous vehicle. At block 702, processing logic obtains MPOI information along the route. At block 703, processing logic obtains real-time traffic information while the autonomous vehicle travels along the route. At block 704, processing logic extracts LR features, TIS features and MPOI features from the LR information, MPOI information, and TIS information. At block 705, a content selection model is applied to the LR features, TIS features and MPOI features, generate an output. At block 706, based on the output from the content selection model, processing logic searches, identifies, and ranks a list of content items form a content database. At block 707, a content item is selected from the list and presented to the user within the autonomous vehicle.

The techniques described throughout this application can be used to provide certain sponsored content, such as advertisements or Ads, to a user riding in an autonomous vehicle, based on the traveling environment at the point in time along a route of a trip (e.g., location and route information, real-time traffic condition, map and point of interests). The sponsored content can also be augmented onto an image or images captured at real-time of the autonomous vehicle's surroundings, creating an augment-reality content delivery environment.

An autonomous vehicle described above refers to a vehicle that can be configured to in an autonomous mode in which the vehicle navigates through an environment with little or no input from a driver. Such an autonomous vehicle can include a sensor system having one or more sensors that are configured to detect information about the environment in which the vehicle operates. The vehicle and its associated controller use the detected information to navigate through the environment. The sensor system may include one or more cameras, a microphone, a global positioning system (GPS), an internal measurement unit (IMU), a radar system, and/or a light detection and range (LIDAR) system.

A GPS system may estimate a geographic location of the autonomous vehicle. The GPS system may include a transceiver operable to provide information regarding the position of the autonomous vehicle. An IMU unit may sense position and orientation changes of the autonomous vehicle based on inertial acceleration. A radar unit may represent a system that utilizes radio signals to sense objects within the local environment of the autonomous vehicle. In some embodiments, in addition to sensing objects, the radar unit may additionally sense the speed and/or heading of the objects. A LIDAR unit may sense objects in the environment in which the autonomous vehicle is located using lasers. The LIDAR unit could include one or more laser sources, a laser scanner, and one or more detectors, among other system components. A camera may include one or more devices capture images of the environment surrounding the autonomous vehicle. The camera may be a still camera or a video camera. A camera may be mechanically movable such as by rotating and/or tilting a platform to which the camera is mounted. A microphone may be configured to capture sound from the environment surrounding the autonomous vehicle.

An autonomous vehicle may further include a computer vision system to process and analyze images captured by one or more cameras in order to identify objects and/or features in the environment of autonomous vehicle. The objects can include traffic signals, road way boundaries, other vehicles, pedestrians, and/or obstacles, etc. The computer vision system may use an object recognition algorithm, video tracking, and other computer vision techniques. In some embodiments, the computer vision system can map an environment, track objects, estimate the speed of objects, etc.

An autonomous vehicle may further include a navigation system to determine a driving path for the autonomous vehicle. For example, the navigation system may determine a series of speeds and directional headings to effect movement of the autonomous vehicle along a path that substantially avoids perceived obstacles while generally advancing the autonomous vehicle along a roadway-based path leading to an ultimate destination. The destination may be set according to user inputs via a user interface. The navigation system may update the driving path dynamically while the autonomous vehicle is in operation. The navigation system can incorporate data from a GPS system and one or more maps so as to determine the driving path for the autonomous vehicle.

An autonomous vehicle may further include a collision avoidance system to identify, evaluate, and avoid or otherwise negotiate potential obstacles in the environment of the autonomous vehicle. For example, the collision avoidance system may effect changes in the navigation of the autonomous vehicle by operating one or more subsystems in a control system to undertake swerving maneuvers, turning maneuvers, braking maneuvers, etc. The collision avoidance system may automatically determine feasible obstacle avoidance maneuvers on the basis of surrounding traffic patterns, road conditions, etc. The collision avoidance system may be configured such that a swerving maneuver is not undertaken when other sensor systems detect vehicles, construction barriers, etc. in the region adjacent the autonomous vehicle that would be swerved into. The collision avoidance system may automatically select the maneuver that is both available and maximizes safety of occupants of the autonomous vehicle. The collision avoidance system may select an avoidance maneuver predicted to cause the least amount of acceleration in a passenger cabin of the autonomous vehicle.

An autonomous vehicle may further include a wireless communication system to allow communication between the autonomous vehicle and external systems, such as devices, sensors, other vehicles, etc. within its surrounding environment and/or controllers, servers, etc., which can provide useful information regarding the vehicle's surroundings, such as traffic information, weather information, etc. For example, the wireless communication system can wirelessly communicate with one or more devices directly or via a communication network. The wireless communication system can use any cellular communication network or a wireless local area network (WLAN), e.g., using WiFi. The wireless communication system could communicate directly with a device, for example, using an infrared link, Bluetooth, etc.

Note that some or all of the components as shown and described above may be implemented in software, hardware, or a combination thereof. For example, such components can be implemented as software installed and stored in a persistent storage device, which can be loaded and executed in a memory by a processor (not shown) to carry out the processes or operations described throughout this application. Alternatively, such components can be implemented as executable code programmed or embedded into dedicated hardware such as an integrated circuit (e.g., an application specific IC or ASIC), a digital signal processor (DSP), or a field programmable gate array (FPGA), which can be accessed via a corresponding driver and/or operating system from an application. Furthermore, such components can be implemented as specific hardware logic in a processor or processor core as part of an instruction set accessible by a software component via one or more specific instructions.

Figure 8:
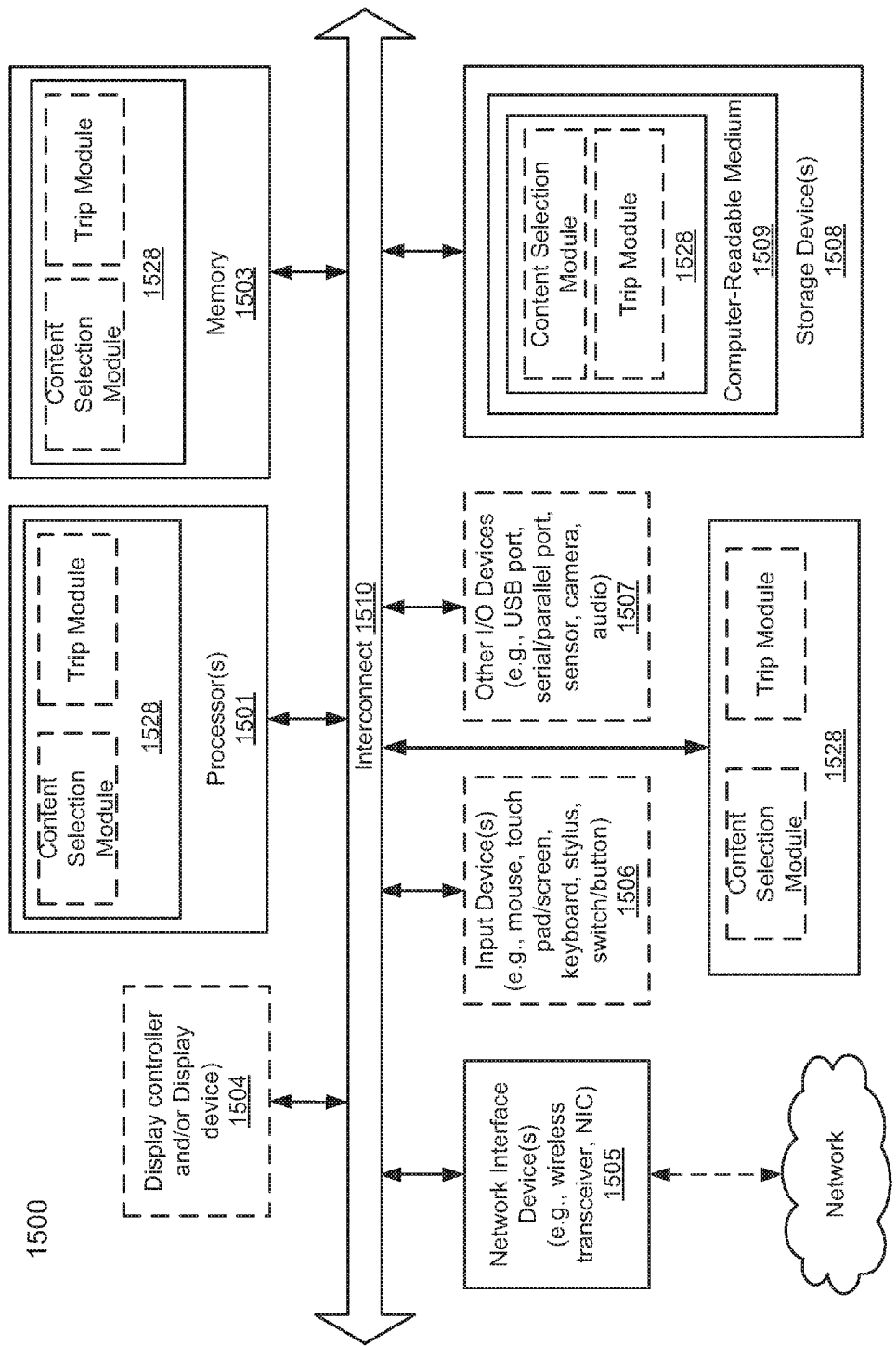
FIG. 8 is a block diagram illustrating a data processing system according to one embodiment.

FIG. 8 is a block diagram illustrating an example of a data processing system which may be used with one embodiment of the invention. For example, system 1500 may represents any of data processing systems described above performing any of the processes or methods described above, such as, for example, data processing system 110 or server 102 of FIG. 1. System 1500 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system.

Note also that system 1500 is intended to show a high level view of many components of the computer system. However, it is to be understood that additional components may be present in certain implementations and furthermore, different arrangement of the components shown may occur in other implementations. System 1500 may represent a desktop, a laptop, a tablet, a server, a mobile phone, a media player, a personal digital assistant (PDA), a Smartwatch, a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 1500 includes processor 1501, memory 1503, and devices 1505-1508 via a bus or an interconnect 1510. Processor 1501 may represent a single processor or multiple processors with a single processor core or multiple processor cores included therein. Processor 1501 may represent one or more general-purpose processors such as a microprocessor, a central processing unit (CPU), or the like. More particularly, processor 1501 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 1501 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 1501, which may be a low power multi-core processor socket such as an ultra-low voltage processor, may act as a main processing unit and central hub for communication with the various components of the system. Such processor can be implemented as a system on chip (SoC). Processor 1501 is configured to execute instructions for performing the operations and steps discussed herein. System 1500 may further include a graphics interface that communicates with optional graphics subsystem 1504, which may include a display controller, a graphics processor, and/or a display device.

Processor 1501 may communicate with memory 1503, which in one embodiment can be implemented via multiple memory devices to provide for a given amount of system memory. Memory 1503 may include one or more volatile storage (or memory) devices such as random access memory (RAM), dynamic RAM (DRAM), synchronous DRAM (SDRAM), static RAM (SRAM), or other types of storage devices. Memory 1503 may store information including sequences of instructions that are executed by processor 1501, or any other device. For example, executable code and/or data of a variety of operating systems, device drivers, firmware (e.g., input output basic system or BIOS), and/or applications can be loaded in memory 1503 and executed by processor 1501. An operating system can be any kind of operating systems, such as, for example, Windows® operating system from Microsoft®, Mac OS®/iOS® from Apple, Android® from Google®, Linux®, Unix®, or other real-time or embedded operating systems such as VxWorks.

System 1500 may further include IO devices such as devices 1505-1508, including network interface device(s) 1505, optional input device(s) 1506, and other optional IO device(s) 1507. Network interface device 1505 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 1506 may include a mouse, a touch pad, a touch sensitive screen (which may be integrated with display device 1504), a pointer device such as a stylus, and/or a keyboard (e.g., physical keyboard or a virtual keyboard displayed as part of a touch sensitive screen). For example, input device 1506 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 1507 may include an audio device. An audio device may include a speaker and/or a microphone to facilitate voice-enabled functions, such as voice recognition, voice replication, digital recording, and/or telephony functions. Other IO devices 1507 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. Devices 1507 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 1510 via a sensor hub (not shown), while other devices such as a keyboard or thermal sensor may be controlled by an embedded controller (not shown), dependent upon the specific configuration or design of system 1500.

To provide for persistent storage of information such as data, applications, one or more operating systems and so forth, a mass storage (not shown) may also couple to processor 1501. In various embodiments, to enable a thinner and lighter system design as well as to improve system responsiveness, this mass storage may be implemented via a solid state device (SSD). However in other embodiments, the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also a flash device may be coupled to processor 1501, e.g., via a serial peripheral interface (SPI). This flash device may provide for non-volatile storage of system software, including a basic input/output software (BIOS) as well as other firmware of the system.

Storage device 1508 may include computer-accessible storage medium 1509 (also known as a machine-readable storage medium or a computer-readable medium) on which is stored one or more sets of instructions or software (e.g., module, unit, and/or logic 1528) embodying any one or more of the methodologies or functions described herein. Module/unit/logic 1528 may represent any of the components described above, such as, for example, a search engine, an encoder, an interaction logging module as described above. Module/unit/logic 1528 may also reside, completely or at least partially, within memory 1503 and/or within processor 1501 during execution thereof by data processing system 1500, memory 1503 and processor 1501 also constituting machine-accessible storage media. Module/unit/logic 1528 may further be transmitted or received over a network via network interface device 1505.

Computer-readable storage medium 1509 may also be used to store the some software functionalities described above persistently. While computer-readable storage medium 1509 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of the present invention. The term "computer-readable storage medium" shall accordingly be taken to include, but not be limited to, solid-state memories, and optical and magnetic media, or any other non-transitory machine-readable medium.

Module/unit/logic 1528, components and other features described herein can be implemented as discrete hardware components or integrated in the functionality of hardware components such as ASICS, FPGAs, DSPs or similar devices. In addition, module/unit/logic 1528 can be implemented as firmware or functional circuitry within hardware devices. Further, module/unit/logic 1528 can be implemented in any combination hardware devices and software components.

Note that while system 1500 is illustrated with various components of a data processing system, it is not intended to represent any particular architecture or manner of interconnecting the components; as such details are not germane to embodiments of the present invention. It will also be appreciated that network computers, handheld computers, mobile phones, servers, and/or other data processing systems which have fewer components or perhaps more components may also be used with embodiments of the invention.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the invention also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments of the present invention are not described with reference to any particular programming language. It will be appreciated that a variety of programming languages may be used to implement the teachings of embodiments of the invention as described herein.

In the foregoing specification, embodiments of the invention have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A computer-implemented method for content delivery in an autonomous vehicle, the method comprising:
   obtaining location and route information of a route associated with the autonomous vehicle;
   obtaining real-time traffic information of the route based on the location and route information;
   obtaining first point of interest (POI) information of the route based on the location and route information;
   determining a driving mode of the autonomous vehicle based on the location and route information and the real-time traffic information;
   selecting a content item from a list of content items obtained from a content database based on the determined driving mode and the first POI information, including extracting a first set of features from the location and route information,
   extracting a second set of features from the real-time traffic information,
   extracting a third set of features from the first POI information, and
   applying a content selection model to the first set, the second set, and the third set of features, generating an output for content selection; and
   displaying the selected content item on a display device within the autonomous vehicle.

2. The method of claim 1, wherein the driving mode includes one of a fast driving mode, a slow driving mode, and a stop mode.

3. The method of claim 2, wherein the selected content item is a media content that can be played by a media player with a playing time configured for the driving mode at a point in time.

4. The method of claim 2, wherein the content item is selected and displayed in response to determining that the driving mode is either a slow driving mode or a stop mode.

5. The method of claim 1, wherein the list of content items are obtained from the content database based on a user profile of a user as a passenger of the autonomous vehicle.

6. The method of claim 1, further comprising:
   capturing an image of an object external to the autonomous vehicle using a camera attached to the autonomous vehicle, while the autonomous vehicle is traveling along the route; and
   performing an image recognition of the image to recognize the object and derive second POI information describing a POI associated with the object, wherein the list of content items are obtained from the content database further based on the second POI information.

7. The method of claim 1, wherein the list of content items are obtained from content database based on the output of the content selection model.

8. The method of claim 1, further comprising ranking the list of content items based on the output of the content selection model, wherein the selected content item is selected based on the rankings of the list.

9. A non-transitory machine-readable medium having instructions stored therein, which when executed by a processor, cause the processor to perform operations of providing content in an autonomous vehicle, the operations comprising:
   obtaining location and route information of a route associated with the autonomous vehicle;
   obtaining real-time traffic information of the route based on the location and route information;
   obtaining first point of interest (POI) information of the route based on the location and route information;
   determining a driving mode of the autonomous vehicle based on the location and route information and the real-time traffic information;
   selecting a content item from a list of content items obtained from a content database based on the determined driving mode and the first POI information, including extracting a first set of features from the location and route information, extracting a second set of features from the real-time traffic information, extracting a third set of features from the first POI information, and
   applying a content selection model to the first set, the second set, and the third set of features, generating an output for content selection; and
   displaying the selected content item on a display device within the autonomous vehicle.

10. The non-transitory machine-readable medium of claim 9, wherein the driving mode includes one of a fast driving mode, a slow driving mode, and a stop mode.

11. The non-transitory machine-readable medium of claim 10, wherein the selected content item is a media content that can be played by a media player with a playing time configured for the driving mode at a point in time.

12. The non-transitory machine-readable medium of claim 10, wherein the content item is selected and displayed in response to determining that the driving mode is either a slow driving mode or a stop mode.

13. The non-transitory machine-readable medium of claim 9, wherein the list of content items are obtained from the content database based on a user profile of a user as a passenger of the autonomous vehicle.

14. The non-transitory machine-readable medium of claim 9, wherein the operations further comprise:
   capturing an image of an object external to the autonomous vehicle using a camera attached to the autonomous vehicle, while the autonomous vehicle is traveling along the route; and
   performing an image recognition of the image to recognize the object and derive second POI information describing a POI associated with the object, wherein the list of content items are obtained from the content database further based on the second POI information.

15. The non-transitory machine-readable medium of claim 9, wherein the list of content items are obtained from content database based on the output of the content selection model.

16. The non-transitory machine-readable medium of claim 9, wherein the operations further comprise ranking the list of content items based on the output of the content selection model, wherein the selected content item is selected based on the rankings of the list.

17. A data processing system, comprising:
   a processor; and
   a memory coupled to the processor for storing instructions, which when executed by the processor, cause the processor to perform operations of providing content in an autonomous vehicle, the operations including
   obtaining location and route information of a route associated with the autonomous vehicle,
   obtaining real-time traffic information of the route based on the location and route information,
   obtaining first point of interest (POI) information of the route based on the location and route information, determining a driving mode of the autonomous vehicle based on the location and route information and the real-time traffic information, selecting a content item from a list of content items obtained from a content database based on the determined driving mode and the first POI information, including extracting a first set of features from the location and route information, extracting a second set of features from the real-time traffic information, extracting a third set of features from the first POI information, and applying a content selection model to the first set, the second set, and the third set of features, generating an output for content selection, and displaying the selected content item on a display device within the autonomous vehicle.

18. The system of claim 17, wherein the driving mode includes one of a fast driving mode, a slow driving mode, and a stop mode.

19. The system of claim 18, wherein the selected content item is a media content that can be played by a media player with a playing time configured for the driving mode at a point in time.

20. The system of claim 18, wherein the content item is selected and displayed in response to determining that the driving mode is either a slow driving mode or a stop mode.

21. The system of claim 17, wherein the list of content items are obtained from the content database based on a user profile of a user as a passenger of the autonomous vehicle.

22. The system of claim 17, wherein the operations further comprise:

capturing an image of an object external to the autonomous vehicle using a camera attached to the autonomous vehicle, while the autonomous vehicle is traveling along the route; and performing an image recognition of the image to recognize the object and derive second POI information describing a POI associated with the object, wherein the list of content items are obtained from the content database further based on the second POI information.

23. The system of claim 17, wherein the list of content items are obtained from content database based on the output of the content selection model.

24. The system of claim 17, wherein the operations further comprise ranking the list of content items based on the output of the content selection model, wherein the selected content item is selected based on the rankings of the list.

\* \* \* \* \*